US009784215B2

United States Patent
Lu et al.

(10) Patent No.: US 9,784,215 B2
(45) Date of Patent: Oct. 10, 2017

(54) EXHAUST NOZZLE CENTER BODY ATTACHMENT

(71) Applicant: ROHR, INC., Chula Vista, CA (US)

(72) Inventors: Jacques Jinqiu Lu, Murrieta, CA (US); Chad Franks, San Diego, CA (US); Richard S. Alloway, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 271 days.

(21) Appl. No.: 14/536,273

(22) Filed: Nov. 7, 2014

(65) Prior Publication Data

US 2016/0131083 A1 May 12, 2016

(51) Int. Cl.

| | |
|---|---|
| *F02K 1/00* | (2006.01) |
| *F02K 1/80* | (2006.01) |
| *F01D 25/24* | (2006.01) |
| *F01D 25/30* | (2006.01) |
| *F02K 1/04* | (2006.01) |

(52) U.S. Cl.
CPC .............. *F02K 1/80* (2013.01); *F01D 25/243* (2013.01); *F01D 25/30* (2013.01); *F02K 1/04* (2013.01); *F05D 2220/30* (2013.01); *F05D 2230/642* (2013.01); *F05D 2300/176* (2013.01); *F05D 2300/177* (2013.01); *F05D 2300/20* (2013.01);

(Continued)

(58) Field of Classification Search
CPC .......... F02C 7/20; F01D 25/243; F01D 25/30; F01D 25/28; F02K 1/82; F02K 1/805; F02K 1/80; F02K 1/78; F02K 1/04; F05D 2260/31; F05D 2260/30; F05D 2240/91
See application file for complete search history.

(56) References Cited

U.S. PATENT DOCUMENTS 5,592,814 A * 1/1997 Palusis .................... F02K 1/80
60/753
7,153,054 B2 12/2006 Arbona
(Continued)

FOREIGN PATENT DOCUMENTS

| DE | 102008044445 | 2/2009 |
|---|---|---|
| EP | 1598562 | 11/2005 |

(Continued)

OTHER PUBLICATIONS

Extended European Search Report dated Apr. 4, 2016 in European Application No. 15193459.3.

(Continued)

*Primary Examiner* — Andrew Nguyen
*Assistant Examiner* — Edwin Kang
(74) *Attorney, Agent, or Firm* — Snell & Wilmer, L.L.P.

(57) ABSTRACT

A ceramic turbine engine exhaust component, such as a ceramic matrix composite ("CMC") exhaust center body may be positioned around a metallic attachment ring. The attachment ring may have a greater coefficient of thermal expansion than the CMC center body. A plurality of bolts radially-spaced around the circumference of the attachment ring may be inserted through apertures in the center body with a sliding fit, and may be coupled to the attachment ring. The bolts may slide within the apertures, allowing the attachment ring to thermally expand without applying extra loads on the exhaust center body due to the expansion.

14 Claims, 4 Drawing Sheets

(52) U.S. Cl.
CPC ..... *F05D 2300/6033* (2013.01); *Y02T 50/672* (2013.01)

(56) References Cited

U.S. PATENT DOCUMENTS

| | | | |
|---|---|---|---|
| 7,722,317 B2 | 5/2010 | Schiavo | |
| 2005/0260034 A1* | 11/2005 | Arbona | B62D 29/048 403/408.1 |
| 2008/0178465 A1 | 7/2008 | Schiavo et al. | |
| 2010/0263194 A1* | 10/2010 | Morrison | F16B 5/0266 29/525.04 |
| 2011/0203255 A1* | 8/2011 | Conete | F02K 1/80 60/226.1 |
| 2012/0023968 A1 | 2/2012 | Shteyman et al. | |
| 2014/0165574 A1* | 6/2014 | Bienvenu | F02K 1/04 60/770 |
| 2014/0241863 A1* | 8/2014 | Tardif | F01D 25/24 415/145 |
| 2015/0152788 A1* | 6/2015 | De Sousa | F01D 25/24 60/39.5 |
| 2015/0226083 A1* | 8/2015 | Renggli | F02C 7/20 60/796 |
| 2015/0322890 A1* | 11/2015 | Lu | F02K 1/80 60/770 |

FOREIGN PATENT DOCUMENTS

| | | |
|---|---|---|
| EP | 2944776 | 11/2015 |
| FR | 2988777 | 10/2013 |
| WO | 2013121155 | 8/2013 |
| WO | 2014058502 | 4/2014 |

OTHER PUBLICATIONS

Office Action dated Jan. 9, 2017 in U.S. Appl. No. 14/275,755.
Extended European Search Report dated Oct. 21, 2015 in European Application No. 15167138.5.
Notice of Allowance dated Apr. 17, 2017 in U.S. Appl. No. 14/275,755.
Communication under Rule 71(3) EPC dated Mar. 8, 2017 in European Application No. 15167138.5.

* cited by examiner

EXHAUST NOZZLE CENTER BODY ATTACHMENT

FIELD

The present disclosure relates to turbine engine systems and, more specifically, to an attachment system for use with a turbine engine center body.

BACKGROUND

A typical gas turbine engine exhaust nozzle assembly on a commercial aircraft includes an annular nozzle surrounding a generally conically-shaped center body to form between them an annular exhaust exit for the engine core exhaust stream. FIG. 1 illustrates the basic geometry of the exhaust nozzle assembly.

Of course, the materials that form the exhaust nozzle assembly must be able to withstand the high temperatures and other environmental conditions. As the combustion temperatures of modern turbine engines increase, the exhaust temperatures may also increase. At a certain point, there are few or no metallic materials that can withstand such a high temperature environment with a reasonable part thickness and weight and while maintaining the mechanical and other properties needed for the exhaust assembly. Thus, ceramic-based materials are increasingly being explored for exhaust components. Ceramic components can also be generally lower weight than equivalent metallic components.

One problem to overcome with a ceramic-based exhaust component is how to mechanically attach the component to the metallic structures of the engine. Ceramics in general have a much lower coefficient of thermal expansions than metals. In an exhaust system made up of ceramic components attached to metallic support structure, the metallic support structure will expand to a much greater degree than the ceramic components when the system reaches the elevated operating temperatures. Thus, the mechanical attachment must take into account the relative expansion and movement between the ceramic components and the metallic components.

SUMMARY

A mechanical attachment system for an exhaust component of a turbine engine may comprise the exhaust component constituting either a nozzle or a center body and comprising a housing, the housing comprising an aperture, a bushing inserted at least partially within the aperture, an attachment ring, and a bolt configured to be inserted at least partially within the bushing and forming a sliding fit therewith, and the bolt is coupled to the attachment ring.

A mechanical attachment system for an exhaust component of a turbine propulsion engine of an aircraft may comprise the exhaust component constituting either a nozzle or a center body and formed from a material have a first coefficient of thermal expansion, the exhaust component comprising a cylindrical housing, the cylindrical housing comprising a plurality of radially-spaced apertures around its circumference. The system may comprise a plurality of metallic bushings, one inserted at least partially within each of the plurality of radially-spaced apertures. The system may comprise a metallic attachment ring configured to be attached to the turbine propulsion engine and formed from a metallic material having a second coefficient of thermal expansion which is greater than the first coefficient of thermal expansion. The system may comprise a plurality of bolts, one inserted at least partially within each of each of the plurality of metallic bushings and forming a sliding fit therewith, the plurality of bolts each coupled to the metallic attachment ring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A ceramic exhaust nozzle or center body may be positioned around a metallic attachment ring. The CMC exhaust nozzle or center body may have a reduced weight and improved thermal properties as compared to equivalent metallic nozzles or center bodies. The metallic attachment ring may have a greater coefficient of thermal expansion than the ceramic nozzle or center body. A plurality of bolts may be inserted through apertures in the exhaust nozzle or center body and coupled to the attachment ring. The bolts may slide within the apertures, creating a sliding support between the parts and allowing the attachment ring to thermally expand without the expansion applying an additional load on the exhaust nozzle or center body.

Figure 1:
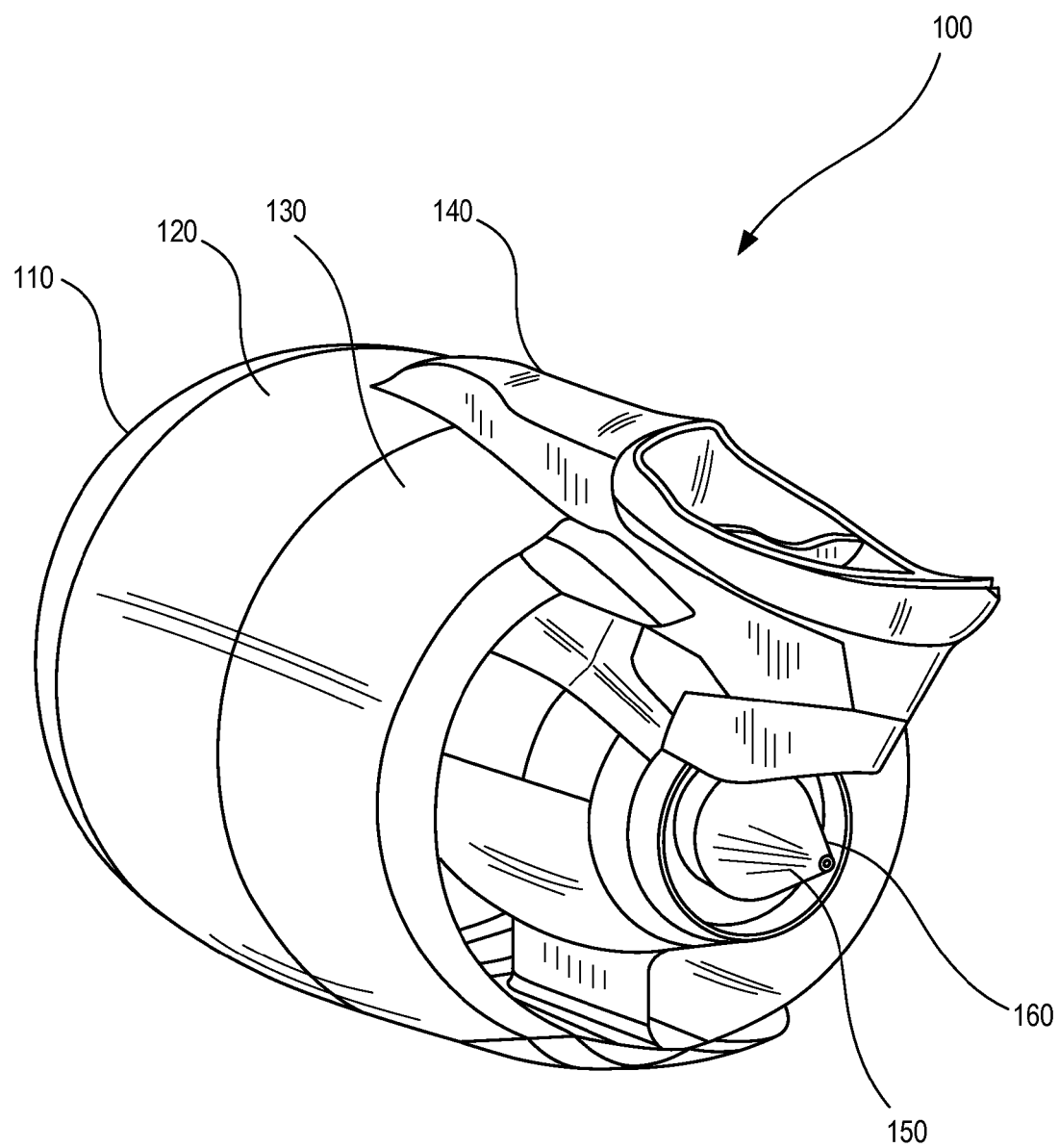
FIG. 1 illustrates a perspective view of a nacelle in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Nacelle 100 may further comprise an exhaust nozzle assembly including an annular nozzle 160 surrounding a generally conically-shaped center body 150. Hot core exhaust gas from a gas turbine engine exits the gas turbine engine between the exhaust nozzle 160 and center body 150. The exhaust nozzle 160 and center body 150 may each be coupled to the gas turbine engine via a center body attachment system, as described with reference to FIGS. 2-4, which illustrates the system as applied to a center body, but is equally applicable to a nozzle as will be apparent to those of ordinary skill in this art.

Figure 2:
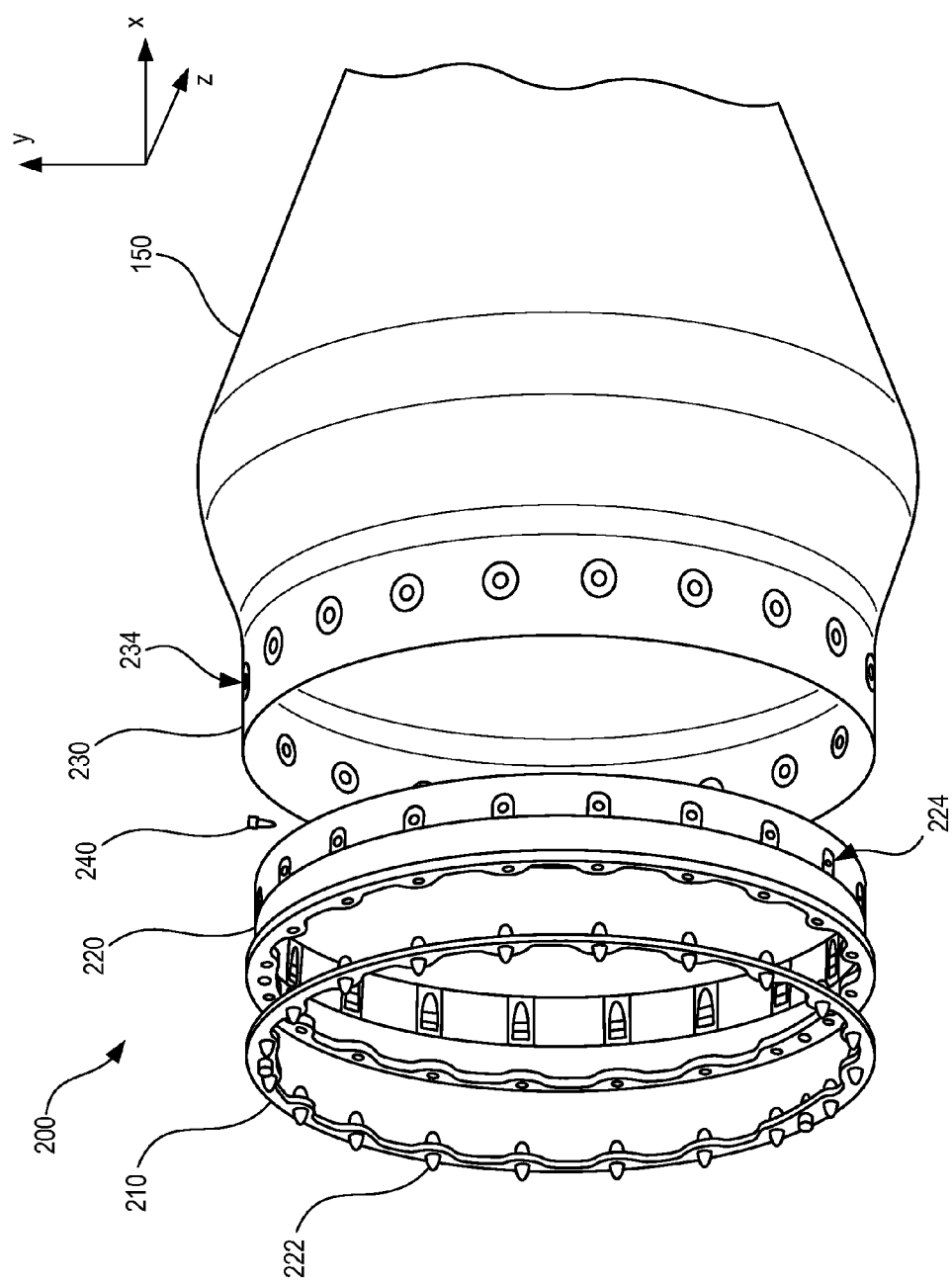
FIG. 2 illustrates a perspective view of a center body attachment assembly in accordance with various embodiments.

Referring to FIG. 2, a center body attachment system 200 may comprise an engine flange 210, a center body attachment ring 220, and a ceramic matrix composite "CMC" housing 230 of the center body 150. X-y-z axes are shown for ease of illustration. The center body attachment ring 220 may be coupled to the engine flange 210 via a plurality of attachment bolts 222. The attachment bolts 222 may be inserted in an axial direction (along the x-axis). The center body attachment ring 220 may comprise an axially extending cylinder (about the x-axis), comprising an outer diameter chosen to fit radially inward (along the y-axis) of the CMC housing 230. The CMC housing 230 may be slid onto the center body attachment ring 220. The CMC housing 230 may be coupled to the center body attachment ring 220 via a plurality of bolts 240. The bolts 240 may be inserted in a radial direction through a plurality of apertures 234 in the CMC housing 230 and a plurality of apertures 224 in the center body attachment ring 220. The bolts 240 have a recessed hex head feature, which are sometimes called cap screws.

The center body attachment ring 220 may have a coefficient of thermal expansion greater than the coefficient of thermal expansion of the CMC housing 230. In various embodiments, the center body attachment ring 220 may comprise an austenitic nickel-chromium-based alloy such as Inconel®, which is available from Special Metals Corporation of New Hartford, N.Y., USA. However, the center body attachment ring 220 may comprise a variety of nickel and chromium based alloys, such as Inconel® MA754, an oxide dispersion strengthened nickel-chromium super alloy; René 41, a nickel-cobalt high temperature alloy; Haynes® 244, a nickel-cobalt alloy manufactured by Haynes International, Inc.; or Haynes® 282, a wrought gamma-prime strengthened superalloy manufactured by Haynes International, Inc. The center body attachment system 200 may be subject to operating environments that experience a wide range of temperatures, such as from 0° F. to 1,400° F. (−20° C. to 760° C.). The center body attachment ring 220 may expand more than the CMC housing 230 in response to the same increase in temperature. The bolts 240 may slide in a radial direction within the apertures 234 in the CMC housing 230. The center body attachment system 200 may be configured to decrease loading on the CMC housing 230 which could cause the CMC housing 230 to crack or otherwise be damaged in response to a change in temperature.

Figure 3:
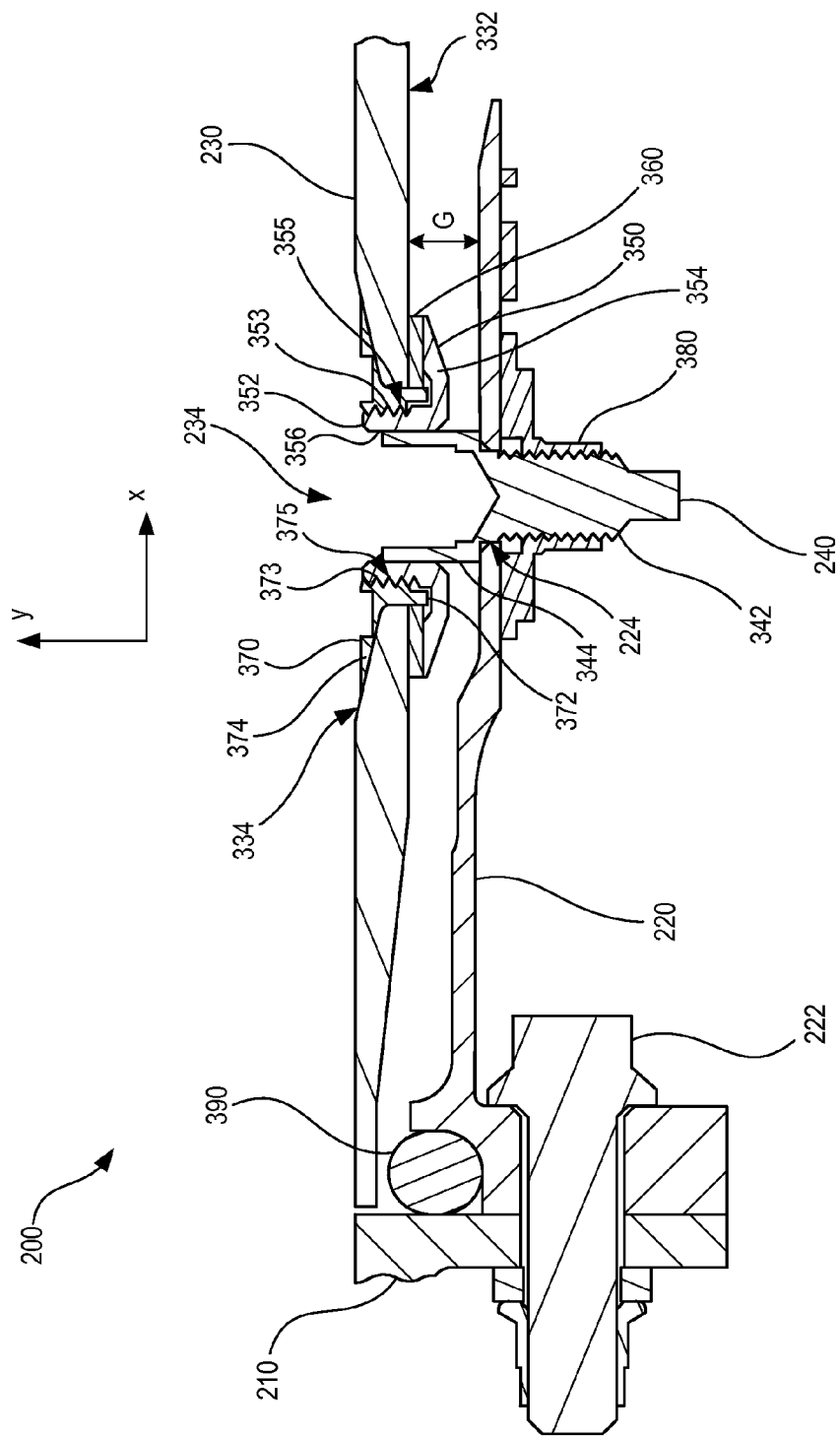
FIG. 3 illustrates a cross section view of a portion of a center body attachment assembly in accordance with various embodiments.

Referring to FIG. 3, a cross section of a portion of the center body attachment system 200 is illustrated according to various embodiments. The center body attachment ring 220 may be coupled to the engine flange 210 via the attachment bolt 240. The CMC housing 230 may be located around the center body attachment ring 220 and separated from the center body attachment ring 220 by a gap G. The CMC housing 230 may comprise an aperture 234. A bushing nut 350 may be located at least partially within the aperture 234. The bushing nut 350 may comprise a cylinder 352 and a collar 354 extending from the cylinder 352. The cylinder 352 may comprise threads 353 on an outer surface 355 of the cylinder 352. The cylinder 352 may have a smooth inner surface 356. A washer 360 may be located between the collar 354 and an inner surface 332 of the CMC housing 230. An insert housing 370 may be located at least partially within the aperture 234. The insert housing 370 may comprise a cylinder 372 and a collar 374 extending from the cylinder 372. The cylinder 372 may comprise threads 373 on an inner surface 375 of the cylinder 372. The insert housing 370 may be threaded onto the bushing nut 350. The insert housing 370 may be tightened until the collar 374 of the insert housing 370 contacts a countersunk outer surface 334 of the CMC housing 230, and the collar 354 of the bushing nut 350 clamps the washer 360 between the collar 354 and the inner surface 332 of the CMC housing 230. The bushing nut 350 and the insert housing 370 may be formed of a metallic material. The aperture 234 is tapered and the collar 354 of the bushing nut 350 is similarly tapered. The geometry of this taper is selected to ensure that as the bushing nut 350 and the insert housing 370 thermally expand both radially and axially, they maintain a tight grip on the aperture 234.

The bolt 240 may be inserted through the bushing nut 350. A threaded shaft 342 of the bolt 240 may be inserted through an aperture 224 in the center body attachment ring 220. The threaded shaft 342 may be threaded into a nutplate 380. The bolt 240 may be tightened until the head 344 of the bolt 240 contacts the center body attachment ring 220, clamping the bolt 240 and the nutplate 380 to the center body attachment ring 220. The outer surface of the head 344 of the bolt 240 may be cylindrical, or circular in cross-section. The head 344 may be configured to translate within the bushing nut 350 with a close sliding fit. To this end, head 344 may have a diameter of its cylindrical portion that closely matches, but is slightly smaller than the diameter of the smooth inner surface 356 of the cylinder 352 of the bushing nut 350. This sliding fit allows relative sliding in the radial "y" direction but no relative movement in the "x" or "z" directions. Loads exerted on the center body 150 may thus be effectively transferred to the bolt 240 and then to the attachment ring 220 and the engine.

A seal 390 may be disposed about a radially outward surface (along the y-axis) of the center body attachment ring 220 between the center body attachment ring 220 and the engine flange 210. In various embodiments, the seal 390 prevents exhaust gases from escaping between the juncture of the engine flange 210 and the CMC housing 230. In various embodiments, the seal 390 comprises a curved piece of mechanically elastic material, for example, an elastic metal. In various embodiments, the seal 390 comprises an austenitic nickel-chromium-based alloy.

Figure 4:
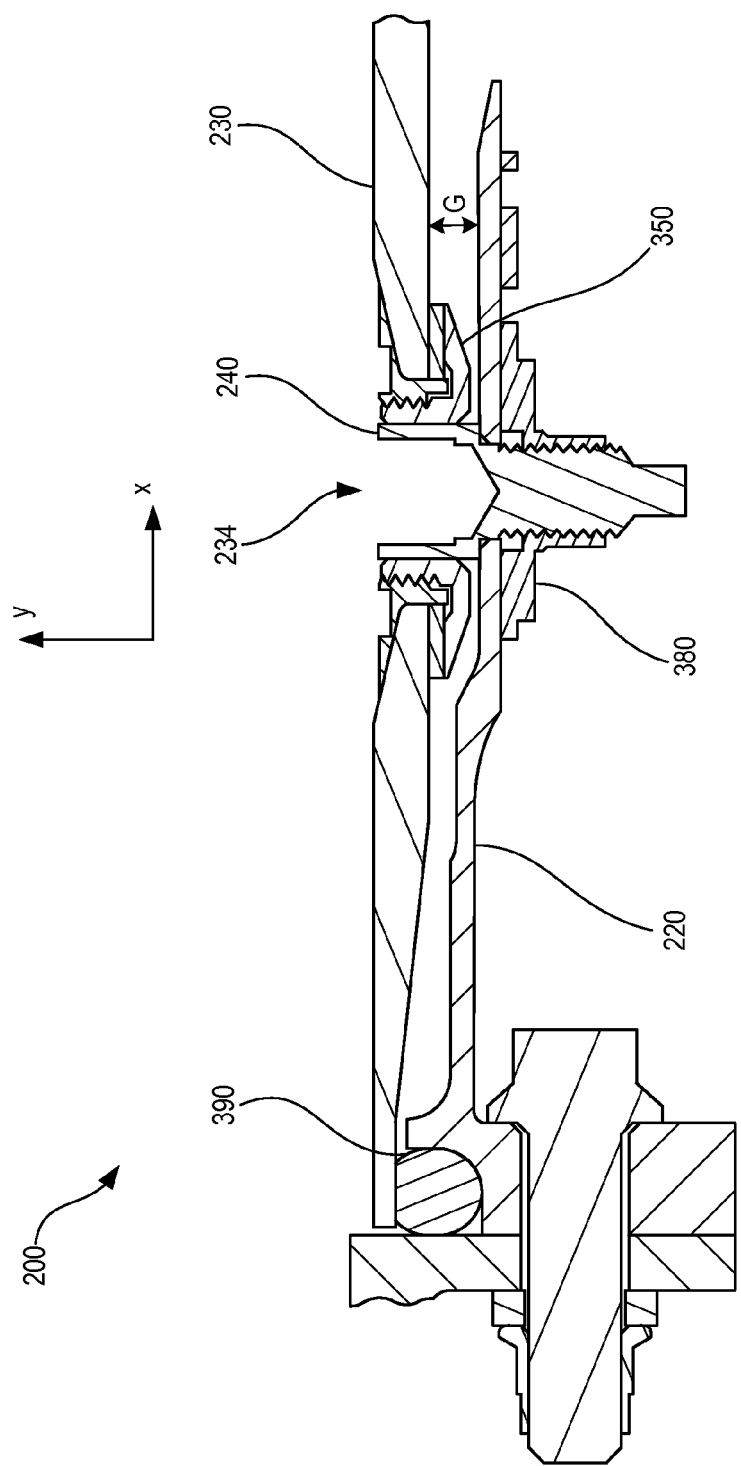
FIG. 4 illustrates a cross section view of a portion of a center body attachment assembly at an increased temperature in accordance with various embodiments.

Referring to FIG. 4, a cross section of a portion of the center body attachment system 200 is illustrated at an increased temperature relative to FIG. 3 according to various embodiments. As the temperature increases, the center body attachment ring 220 may expand to a greater extent than the CMC housing 230 as a result of the differing coefficients of thermal expansion. The differing thermal expansion may cause the gap G to decrease. Additionally, the differing thermal expansion may cause the bolt 240 to move radially outward (positive y-direction) within the bushing nut 350, but note that the bolt 240 remains recessed in the cylinder 352 at the max design temperature to maintain low drag. The bushing nut 350 or the bolt 240 may comprise a coating which decreases friction and wear between the bolt 240 and the bushing nut 350. As the center body attachment ring 220 expands, the seal 390 may contact the CMC housing 230. The seal 390 may prevent exhaust gases from entering the CMC housing 230.

FIGS. 2-4 illustrate only the components for a single sliding support or connection between the CMC housing 230 and the attachment ring 220. Of course, the CMC housing 230 will have a plurality of radially-spaced apertures 234 disposed about its circumference, and the attachment ring will have an equal number of nutplates 380 to form a plurality of sliding supports or connections. The plurality of bolts 240 disposed around the circumference of the CMC housing 230 will support the CMC housing 230 and transfer all the necessary torques, bending moments and forces to the engine, while allowing the center body attachment ring 220 to expand relative to the CMC housing 230.

In various embodiments, center body attachment systems may comprise multiple materials, or any material configuration suitable to enhance or reinforce the resiliency and/or support of the system when subjected to wear in an aircraft operating environment or to satisfy other desired electromagnetic, chemical, physical, or biological properties, for example radar signature, load capacity, and/or heat tolerance.

In various embodiments, various components may comprise a CMC. For example, various aspects of the center body 150 and/or the CMC housing 230 may comprise a CMC. However, in various embodiments, the center body 150 and/or the CMC housing 230 may comprise at least one of a carbon-carbon composite, a ceramic material, graphite, or any other suitable material. Thus, as discussed herein, the center body 150 and the CMC housing 230 may exhibit a different coefficient of thermal expansion than the engine flange 210 and the center body attachment ring 220. However, the different materials may be securely mounted in slidable mechanical communication according to the principles discussed herein. In various embodiments, a CMC may generally comprise one or more ceramic materials disposed on or within another material, such as, for example, a ceramic material disposed within a structure comprised of a fibrous material. Fibrous materials, such as carbon fiber, aramid fibers, fiberglass fibers, and the like may be formed into fibrous structures suitable for this purpose. Deposition of a ceramic material into or onto a fibrous material may be accomplished using chemical vapor infiltration (CVI), melt infiltration (MI), and slurry casting (SC) may be used, alone or in various combinations, to partially or fully impregnate a fibrous structure with the ceramic material.

Moreover, the center body 150 may comprise any material suitably lightweight and heat tolerant. In various embodiments, various aspects of the center body 150 may comprise refractory metal, for example, an alloy of titanium, for example titanium-zirconium-molybdenum (TZM).

While the center body attachment systems described herein have been described in the context of aircraft applications, one will appreciate in light of the present disclosure that the system described herein may be used in connection with various other vehicles, for example, a launch vehicle, a spacecraft, an unmanned aerial vehicle, a missile, cars, trucks, busses, trains, boats, and submersible vehicles, or any other vehicle or device, or in connection with industrial processes, or propulsion systems, or any other system or process having different materials exposed to fluctuating temperatures.

Additionally, although described primarily with reference to ceramic matrix composite center bodies, the present disclosure may be used with various materials having relatively low coefficients of thermal expansion, such as carbon-carbon composites, ceramic materials, and graphite. The systems disclosed herein may be used to attach any components having differing coefficients of thermal expansion.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A mechanical attachment system for an exhaust component of a turbine engine comprising:
the exhaust component constituting either a nozzle or a center body and comprising a housing, the housing comprising an aperture;
a bushing inserted at least partially within the aperture;
an attachment ring; and
a bolt configured to be inserted at least partially within the bushing and forming a sliding fit therewith, and the bolt is coupled to the attachment ring, wherein a head of the bolt is in contact with the attachment ring, wherein the head of the bolt is contained within a cylinder formed by the bushing and the head of the bolt is recessed within the cylinder.

2. The system of claim 1, wherein the housing comprises a ceramic matrix composite.

3. The system of claim 1, wherein the housing has a coefficient of thermal expansion which is less than a coefficient of thermal expansion of the attachment ring.

4. The system of claim 1, wherein the attachment ring is configured to couple to an engine flange.

5. The system of claim 1, wherein the bolt is configured to slide within the bushing in response to temperature thermal expansion of the attachment ring.

6. The system of claim 1, wherein the attachment ring comprises an austenitic nickel-chromium-based alloy.

7. The system of claim 1, further comprising a nutplate mounted on the attachment ring, wherein the bolt is configured to threadingly engage the nutplate.

8. The system of claim 1, wherein the housing is configured to be separated from the attachment ring by a gap.

9. A mechanical attachment system for an exhaust component of a turbine propulsion engine of an aircraft, the system comprising:
the exhaust component constituting either a nozzle or a center body and formed from a material have a first coefficient of thermal expansion, the exhaust component comprising a cylindrical housing, the cylindrical housing comprising a plurality of radially-spaced apertures around its circumference;
a plurality of metallic bushings, one inserted at least partially within each of the plurality of radially-spaced apertures;
a metallic attachment ring configured to be attached to the turbine propulsion engine and formed from a metallic material having a second coefficient of thermal expansion which is greater than the first coefficient of thermal expansion; and
a plurality of bolts, one inserted at least partially within each of each of the plurality of metallic bushings and forming a sliding fit therewith, the plurality of bolts each coupled to the metallic attachment ring, wherein each of the plurality of bolts comprises a head in contact with the metallic attachment ring, wherein the head of each of the plurality of bolts is contained within a cylinder formed by each of the plurality of metallic bushings and the head of the bolt is recessed within the cylinder.

10. The system of claim 9 wherein the cylindrical housing of the exhaust component is formed from a ceramic.

11. The system of claim 9 further comprising a seal positioned between the metallic attachment ring and a forward end of the cylindrical housing which seals therebetween at least when the metallic attachment ring has thermally expanded according to its max operating temperature.

12. The system of claim 9 wherein each of the plurality of metallic bushings is tapered where it contacts the respective radially-spaced aperture and the respective radially-spaced aperture is correspondingly tapered.

13. The system of claim 12 further comprising an insert housing attached to each of the plurality of metallic bushings, wherein the cylindrical housing is positioned and clamped between each of the plurality of metallic bushings and the insert housing.

14. The system of claim 9 wherein the recessed head of each of the plurality of bolts comprises a recessed hex head and a smooth, cylindrical outer head surface.

* * * * *